(12) United States Patent
Blin et al.

(10) Patent No.: US 8,939,713 B2
(45) Date of Patent: Jan. 27, 2015

(54) AERODYNAMIC ELEMENT FOR AN AIRCRAFT NACELLE

(71) Applicant: Aircelle, Gonfreville l'Orcher (FR)

(72) Inventors: Céline Blin, Lanquetot (FR); Guillaume Strub, Le Havre (FR); Vincent Peyron, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/681,219

(22) Filed: Nov. 19, 2012

(65) Prior Publication Data

US 2013/0266448 A1    Oct. 10, 2013

Related U.S. Application Data

(63) Continuation of application No. PCT/FR2011/051043, filed on May 9, 2011.

(30) Foreign Application Priority Data

May 19, 2010 (FR) ...................................... 10 53855

(51) Int. Cl.

| | |
|---|---|
| *F01D 5/00* | (2006.01) |
| *F04D 29/66* | (2006.01) |
| *F01D 25/24* | (2006.01) |
| *B64D 29/00* | (2006.01) |
| *B64D 33/02* | (2006.01) |

(52) U.S. Cl.

CPC ............... *F01D 25/24* (2013.01); *B64D 29/00* (2013.01); *B64D 33/02* (2013.01)

USPC ............ 415/119; 415/127; 415/140; 415/220

(58) Field of Classification Search

USPC ........... 415/91, 119, 126, 127, 128, 135, 140, 415/141, 191, 196, 208.1, 209.3, 213.1, 220

See application file for complete search history.

(56) References Cited

U.S. PATENT DOCUMENTS

| | | | | |
|---|---|---|---|---|
| 3,591,963 | A | * | 7/1971 | Kopp .............................. 60/801 |
| 4,022,948 | A | * | 5/1977 | Smith et al. ................ 428/542.8 |
| 6,328,258 | B1 | * | 12/2001 | Porte ........................... 244/53 B |

(Continued)

FOREIGN PATENT DOCUMENTS

| | | |
|---|---|---|
| DE | 1751550 A1 | 12/1970 |
| EP | 1686056 A2 | 8/2006 |

(Continued)

OTHER PUBLICATIONS

International Search Report issued in International Application No. PCT/FR2011/051043 dated Nov. 16 2011.

*Primary Examiner* — Edward Look
*Assistant Examiner* — Christopher J Hargitt
(74) *Attorney, Agent, or Firm* — Brinks Gilson & Lione

(57) ABSTRACT

An aerodynamic element for an aircraft nacelle is provided that includes a fixed shroud and an intake lip axially movable relative to the shroud. The aerodynamic element is flexible and has a substantially cylindrical general shape and defines an upstream portion attached to the inner wall of the intake lip of the nacelle, and a downstream portion bearing radially against an inner face of the shroud. The downstream portion of the element includes a ring shaped bead protruding towards an outside of the aerodynamic element and an end blade which, at rest, is tilted towards the outside of the aerodynamic element in a direction of its free end.

14 Claims, 4 Drawing Sheets

(56) References Cited

U.S. PATENT DOCUMENTS

| | | | |
|---|---|---|---|
| 8,342,452 B2 * | 1/2013 | Candela et al. | 244/130 |
| 2003/0163985 A1 | 9/2003 | Stretton et al. | |
| 2009/0140104 A1 * | 6/2009 | Surply et al. | 244/53 B |

FOREIGN PATENT DOCUMENTS

| | | |
|---|---|---|
| EP | 2147857 A1 | 1/2010 |
| FR | 2789144 A1 | 8/2000 |
| FR | 2827029 A1 | 1/2003 |

* cited by examiner

AERODYNAMIC ELEMENT FOR AN AIRCRAFT NACELLE

CROSS-REFERENCE TO RELATED APPLICATIONS

This application is a continuation of International Application No. PCT/FR2011/051043 filed on May. 9, 2011, which claims the benefit of FR 10/53855, filed on May. 19, 2010. The disclosures of the above applications are incorporated herein by reference.

FIELD

The present disclosure relates to an aerodynamic element for an aircraft nacelle, as well as to an aircraft nacelle equipped with such an element.

BACKGROUND

The statements in this section merely provide background information related to the present disclosure and may not constitute prior art.

An airplane is propelled by one or several propulsion systems comprising a turbojet engine housed in a tubular nacelle. Each propulsion system is attached to the airplane through a pylon generally located under a wing or at the fuselage.

A nacelle generally has a structure comprising an air intake upstream section, upstream from the engine, a middle section intended to surround a fan of the turbojet engine, and a downstream section intended to surround the combustion chamber of the turbojet engine and harboring thrust reversal means.

The air intake section comprises a cowl including an outer wall and an air intake lip, the lip being adapted for allowing optimal capture towards the turbojet engine of the air required for feeding the fan and the internal compressors of the turbojet engine on the one hand, and a fixed shroud which includes an acoustic panel and which is intended to suitably channel the air towards the blades of the fan on the other hand.

The air intake lip is integrated to the outer wall, which allows suppression of any junction means between these members which may be detrimental to the aerodynamic performances of the nacelle, and the cowl is then designated by LFC (for Laminar Forward Cowl).

The cowl is movable relatively to the shroud between a rear operating position, in which the upstream edge of the lip is located in proximity to or in contact with the upstream edge of the shroud, and a front maintenance position, in which said downstream edge of the lip is moved away from the upstream edge of the shroud, notably for allowing access to the turbojet engine.

The interface area between the lip and the shroud generates aerodynamic perturbations due to the presence of shifts and deviations between these elements, inherent to their attachment with each other.

A known solution for improving the aerodynamic continuity of this interface consists of setting into place in this area an element generally called a "flap". This substantially cylindrical and flexible element is placed against the inner face of the lip and of the shroud. The upstream portion of this element is attached to the lip, while its downstream portion will radially bear against the shroud.

However, the flaps at the prior art are not fully satisfactory. Indeed, it is seen that depending on the relative axial positioning of the lip and of the shroud, there may exist a too large axial deviation between the flap and the shroud, this deviation may typically attain several millimeters. Further, a radial shift of the shroud with respect to the lip may induce a detachment of the downstream extreme portion of the flap. Both of these phenomena are particularly detrimental to the aerodynamics of the nacelle, since they create recessed areas or produce protruding portions in the airflow which perturb the flow of the air upstream from the engine. Now, the shifts between the lip and the shroud are inevitable, notably because the lip is very regularly translated relatively to the shroud for maintenance operations and then for its putting back into the rear operating position.

SUMMARY

According to one form, the present disclosure relates to an aerodynamic element for an aircraft nacelle, said nacelle comprising a fixed shroud on the one hand and an axially movable intake lip relatively to the shroud on the other hand, said element being flexible and having a substantially cylindrical general shape in the mounted position, and comprising:

an upstream portion intended to be attached to the inner wall of the intake lip of the nacelle;

and a downstream portion intended to be radially bearing against the inner face of the shroud.

According to a general definition of the present disclosure, the downstream portion of the element includes a ring-shaped bead protruding outwards and an end blade which at rest is tilted outwards towards its free end.

The element according to the present disclosure covers the interface area between the lip and the shroud, thereby ensuring continuity of the surfaces in this area of the air vein in order to improve the aerodynamics.

The end blade of the element, because of its tilt and its flexibility, will be flattened against the shroud. Accordingly, this blade gives the possibility of covering a possible too large axial deviation between the lip and the shroud, but also of compensating for a possible radial shift between the lip and the shroud.

By "flexible," it is meant that the element and the blade are made in a material which is both capable of being elastically deformed so as to obtain the suitable flattening of the element against the lip and the shroud, and also sufficiently rigid so that the element has the mechanical strength suitable for the stresses to which it is subject. For example, the blade may be made in a composite material or in a reinforcement fabric impregnated with silicone.

Further, in the element according to the invention, with the bead, it is possible to properly position the blade and to protect it, which guarantees that it may fulfill its function properly. Indeed, the bead cooperates with the upstream portion of the shroud, which is preferably provided with an upstream chamfer. This has the effect, during the displacement of the lip rearwards, of causing via the bead, the displacement of the downstream portion of the element radially inwards. Thus, the blade is moved away from the shroud, so that it may not interfere with the engagement of the element inside the shroud and not damage the blade during this engagement. The blade will then be flattened by elasticity against the shroud.

This flattening is favored by the fact that at rest, i.e. when the element is not elastically deformed by contact with the shroud—the blade is tilted. Further, the element may at rest have a slightly divergent shape in the downstream direction.

Advantageously, the end blade has a thickness of less than the thickness of the other portions of the element. This gives the possibility of limiting the aerodynamic impact of the downstream portion of the element. For example, the blade has a thickness of less than 0.75 mm.

The end blade may be substantially planar or curved with a concavity turned outwards. The curvature notably has the function of assuming the lever effect created by the bead which spreads out the compression forces.

In one form, the element comprises means for equalizing pressure on the inner and outer sides of the element, which allows limitation of the detachment effect of this element. These means are typically located in an intermediate portion of the element located between the upstream portion, intended to be attached to the lip of the nacelle, and the downstream portion notably bearing the ring shaped bead.

Means for equalizing pressure for example comprise radial through-orifices made in the element and/or axial passages made in the ring shaped bead. In the latter case, one then has an interrupted bead, appearing as a succession of studs at the periphery of the element. Alternatively, the ring shaped bead may be substantially continuous.

The element is for example made in composite material which may include at least one substantially continuous framework on its periphery. The stresses related to the compression of the element—during the displacement relatively to the shroud or during the placement on the nacelle—and notably to buckling, are taken up by the composite.

According to another form, the element comprises axial slots opening at its downstream end, said slot being filled with an elastomeric material. The filling of the slots gives the possibility of limiting the aerodynamic impact thereof. However, the material selected for filling the slots is sufficiently flexible for allowing a certain deformation of the element at the slots. This deformation allows the placement of the element and the taking up of the displacements.

Advantageously, provision may be made for having the upstream end of each slot open into a circular orifice, in order to prevent crack initiations at the slot end. In this case, the points for attaching the element on the lip are preferably located downstream from the circular orifices so as not to subject said orifices to fatigue.

According to another form, the element is made in a flexible material. In other words, such an element may be made, for which the flexibility is not due to the presence of slots but to the single suitable selection of the material making it up.

The element may be made from at least two substantially identical strips rolled over themselves and attached end to end along axial lines in order to form together a substantially cylindrical general shape. Typically, two strips may be provided, each forming a half cylinder.

In one form, this element comprises an intermediate portion located between the upstream portion and the downstream portion, and the upstream portion has a larger thickness than that of the intermediate portion. This thicker portion allows the element to be attached with members such as screws, without risking any damage to the upstream portion. By providing that this thicker upstream portion will be housed in a recess of the lip, no overthickness detrimental to aerodynamics is created.

According to a second aspect, the present disclosure relates to an aircraft nacelle comprising a fixed shroud on the one hand and an intake lip axially movable relatively to the shroud on the other hand, between a rear operating position and a front maintenance position. The nacelle comprises an aerodynamic element as described earlier, and is laid out so that, when the lip is in the rear position, the upstream portion of the element is attached against the inner face of the inner wall of the intake lip of the nacelle, and housed in a recess formed by an axially inward set back step, and the downstream portion of the element is radially bearing against the inner face of the shroud, the ring shaped bead being housed in a recess formed by an axially inward set back step.

As for the blade, it is bearing against the inner face of the shroud which for example is substantially at the same level as the inner face of the inner wall of the lip. Therefore there is only a very small axial over-thickness of the element mounted on the nacelle, due to the thickness of the blade which is relatively small.

Further areas of applicability will become apparent from the description provided herein. It should be understood that the description and specific examples are intended for purposes of illustration only and are not intended to limit the scope of the present disclosure.

DRAWINGS

Several possible forms of the present disclosure are now described as non-limiting examples, with reference to the appended drawings.

Figure 1:
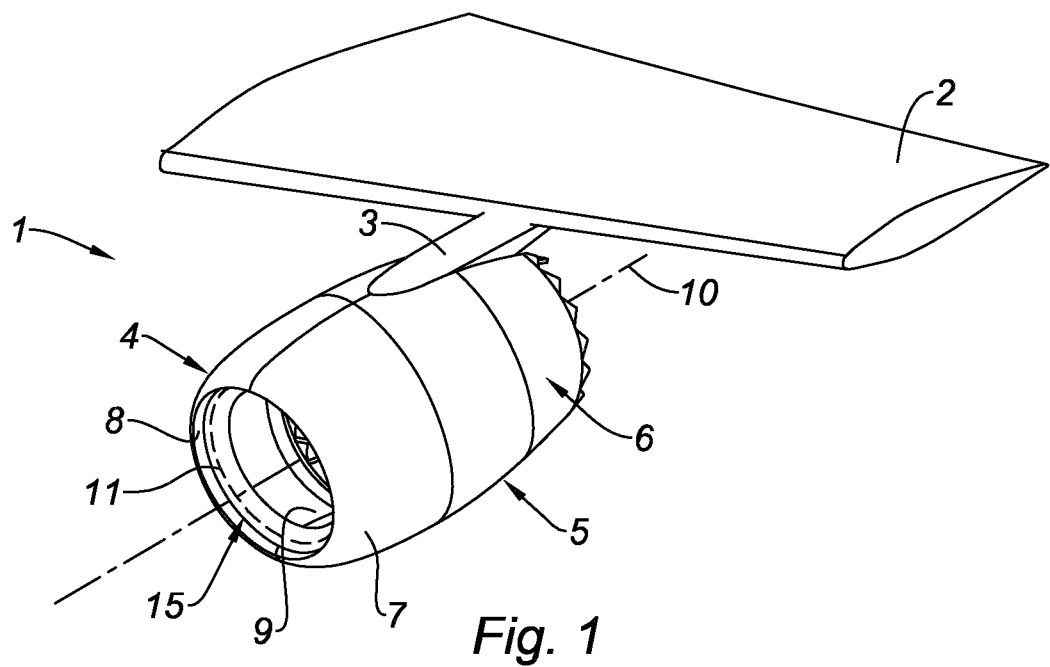
FIGS. 1 and 2 are perspective views of an aircraft wing equipped with a nacelle according to the invention, when the cowl is in the rear operating position relatively to the shroud and when the cowl is in the front maintenance position, respectively.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
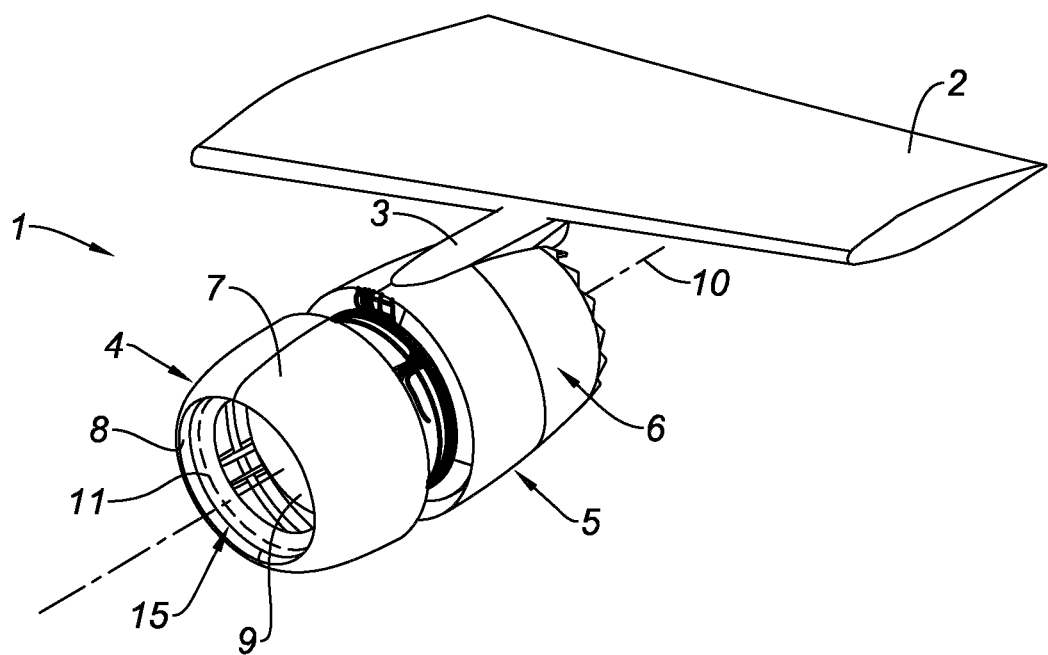

A nacelle 1 according to the present disclosure, as illustrated in FIGS. 1 and 2, forms a tubular housing for a turbojet engine (not visible), which is used for channeling the air flows which it generates by defining internal and external aerodynamic lines required for obtaining optimum performances.

The nacelle 1 is intended to be attached to a fixed structure on an airplane, such as a wing 2, via a mast or pylon 3.

More specifically, the nacelle 1 has a structure comprising an upstream or front section 4 forming an air intake, a middle section 5 surrounding a fan of the turbojet engine, and a downstream or rear section 6 surrounding the turbojet engine and generally harboring a thrust reversal system.

The air intake section 4 comprises a cowl including an outer wall 7 and an air intake lip 8 which is integrated to the outer wall 7 so as to form a single part which may be disassembled. The cowl may however comprise a plurality of panels forming outer wall and intake lip sections, with junction lines extending longitudinally relatively to the nacelle 1.

The air intake in the nacelle 1 is also defined by a fixed shroud 9, attached to the middle section 5 of the nacelle 1 and comprising an acoustic panel.

The longitudinal or axial direction is defined as the direction parallel to the axis 10 of the nacelle 1, corresponding to the axis of an air vein circulating in the nacelle 1. The term of "outer" designates paths located further away from the axis 10, as opposed to the term "inner." The terms of "upstream" and "downstream" are used relatively to the airflow direction, from the air intake section 4 to the rear section 6.

The lip 8—and more generally the cowl, is axially movable relatively to the fixed shroud 9, between:
- a rear operating position (FIGS. 1 and 3), in which the downstream edge 11 of the lip 8 is located in proximity or in contact with the upstream edge 12 of the shroud 9;
- and a front maintenance position (FIG. 2) in which said downstream edge 11 of the lip 8 is located away from the upstream edge 12 of the shroud 9 in order to allow access to the turbojet engine.

Although illustrated by an example of application to a translationally movable air intake lip, the present disclosure may of course be also applied to other parts of the nacelle, notably for example to a flap installed in a reverser with a movable cowl in order to improve the aerodynamics thereof.

According to the present disclosure, the nacelle 1 is equipped with an element 15 intended to ensure aerodynamic continuity between the lip 8 and the shroud 9 in the rear operating position.

Figure 3:
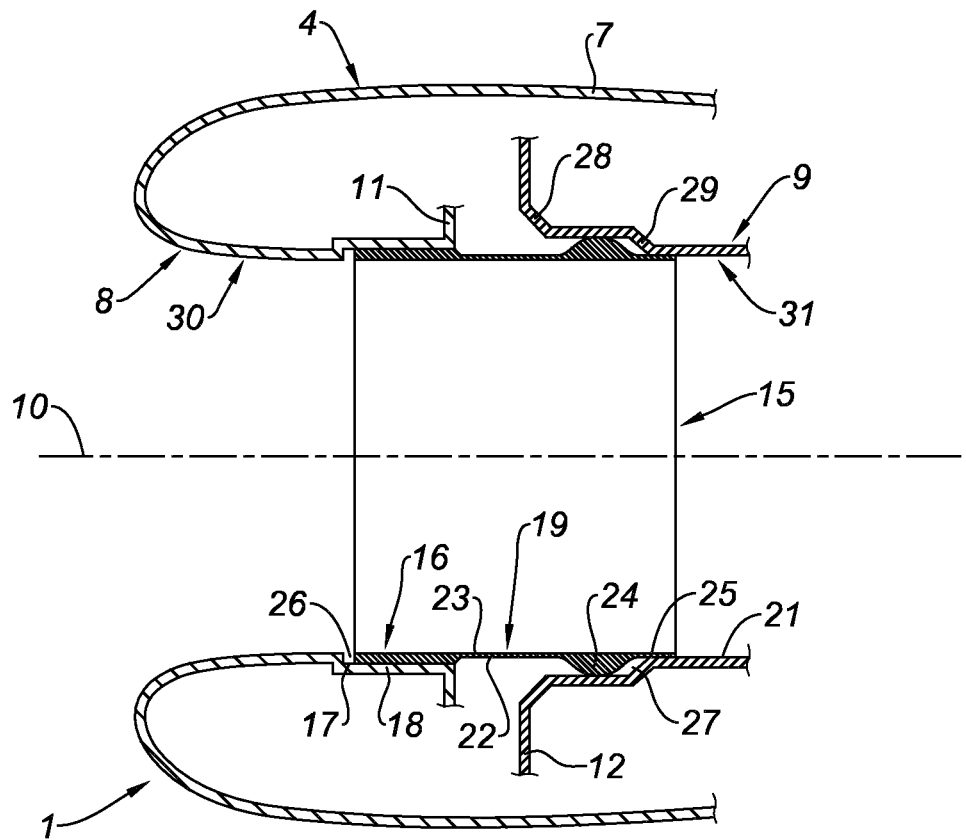
FIG. 3 is a schematic vertical sectional view of the upstream section of the nacelle of FIGS. 1 and 2.

As illustrated in FIGS. 1 to 3, the element 15 in the mounted position, has a substantially cylindrical general shape. It includes:
- an upstream portion 16 attached against the inner face 17 of the inner wall 18 of the lip;
- an intermediate portion 19 covering the interface between the lip 8 and the shroud 9;
- and a downstream portion 20 which will radially bear against the inner face 21 of the shroud 9.

The element 15 includes an outer face 22 on the one hand and an inner face 23 on the other hand, turned towards the axis 10 of the nacelle 1 in the mounted position, which is substantially cylindrical without any overthicknesses and without any protruding portions, in order to provide a globally smooth surface allowing improvement in the aerodynamic continuity and optimization of the airflow.

The upstream portion 16 of the element 15 has a larger thickness than that of the intermediate portion 19. Indeed, the upstream portion 16 forms the area for attaching the element 15 to the nacelle 1 and should therefore be able to withstand the corresponding stresses, while the intermediate portion 19 is essentially used for covering the interface between the lip 8 and the shroud 9. Typically, the thickness of the upstream portion 16 is comprised between 2 and 6 mm and the thickness of the intermediate portion 19 is comprised between 1 and 3 mm.

The downstream portion 20 includes a ring shaped bead 24 protruding from the outer face 22 and an end blade 25 with reduced thickness, typically less than 0.75 mm. At rest, i.e. when the element 15 is not deformed, the blade 25 is tilted outwards in the direction of its free end.

Advantageously, the inner wall 18 of the lip 8 includes a recess 26 formed by an axially inward set back step. The shroud 9 also includes a recess 27 formed by an axially inward set back step, adjacent to an upstream chamfer 28 and a downstream chamfer 29. The nacelle 1 is designed so that the upstream portion 30 of the inner wall 18 of the lip 8, and the downstream portion 31 of the shroud 9 are substantially on a same diameter.

In the mounted position, the upstream portion 16 of the element 15 is housed in the recess 26 of the lip, while the bead 24 is housed in the recess 27 of the shroud 9 and the end blade 25 bears against the downstream portion 31 of the shroud 9. Thus, a substantially cylindrical peripheral face of the air vein is obtained which allows optimization of the airflow and this all the better since the thickness of the blade 25 is relatively small.

The element 15 is flexible, which allows it to be flattened, by elastic deformation against the shroud 9. Provision may be made so that the element 15 is slightly divergent in the downstream direction, at rest, in order to improve the flattening against the shroud 9.

Practically, the element 15 is made from several substantially identical strips 32, generally two in number, which are rolled over themselves and attached end to end along axial lines in order to form together a substantially cylindrical general shape. Each strip 32 has a width—i.e. an axial dimension in the mounted position—of the order of 80 mm. The length of each strip 32, in the case when they are two in number is of the order of 3 m substantially corresponding to a half perimeter of the air vein.

Several possible forms of strips 32 intended to form the element 15, are now described with reference to FIGS. 4 to 9.

Figure 4:
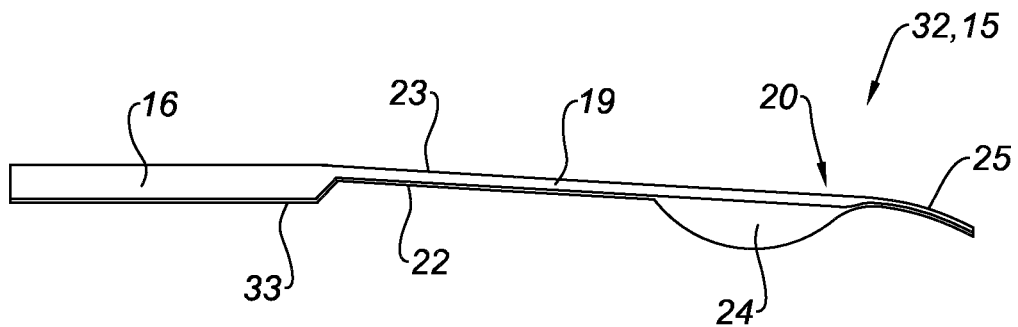
FIG. 4 is a sectional view of an element according to a first form of the present disclosure.
Figure 5:
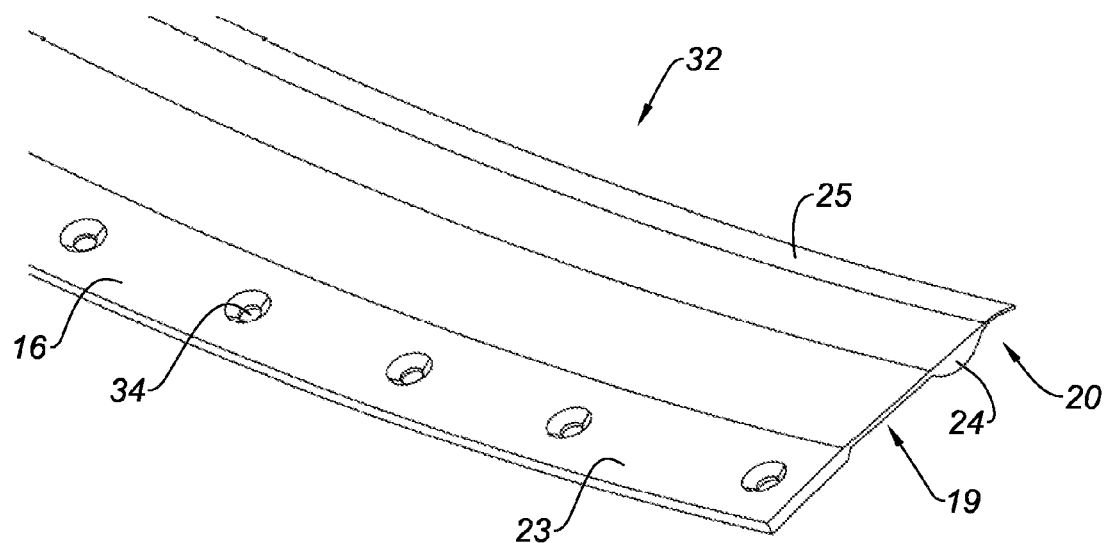
FIGS. 5 and 6 are perspective views of the element of FIG. 4, respectively seen from the interior side and from the exterior side.
Figure 6:
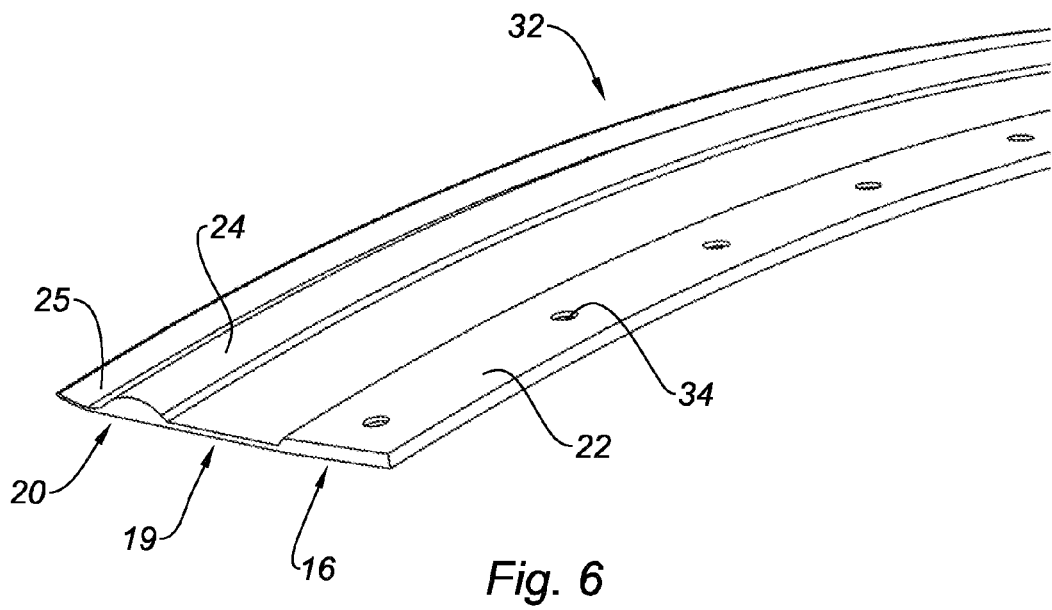

According to a first form, illustrated in FIGS. 4 to 6, the strip 32 is made in a flexible material. The flexibility of the element 15 is in this case only given by the suitable choice of the material. The strip 32 may for example be made in composite material, such as a carbon epoxy (or glass/epoxy in order to have e.g. more flexibility) composite, which may include at least one substantially continuous framework over its length—i.e. on the periphery of the element 15 when the strip 32 is mounted on the nacelle 1. Further, the strip 32 may include an outer layer 33 which covers the whole of its surface and further forms the bead 24 (FIG. 4). This outer layer 33 may typically be made in treated fabric so as to have low friction, notably with a Teflon™ coating, and impregnated with silicone in order to adhere the fabric to the composite core. This low friction fabric gives the possibility of lowering the friction coefficient between the parts 12/21/27/28/29/31 and the flap, which reduces the translational forces and increases the lifetime by improving wear.

The face 23 may be covered with a film in polyvinyl fluoride (a Tedlar™ film) giving the possibility of providing a nice surface condition.

As this will be seen more particularly in FIG. 4, the strip 32 is not perfectly planar but slightly curved outwards from its upstream portion 16 towards its downstream portion 20, so as to form an element 15 which is slightly divergent in the downstream direction, which would promote its flattening against the shroud 9. Further, the end blade 25 is here curved in the extension of the remainder of the strip 32, with its concavity turned outwards. Alternatively, the blade 25 may be substantially planar but tilted outwards.

The upstream portion 16 of the strip 32 comprises successive apertures 34 over its length, intended for letting through attachment members on the lip 8.

Figure 7:
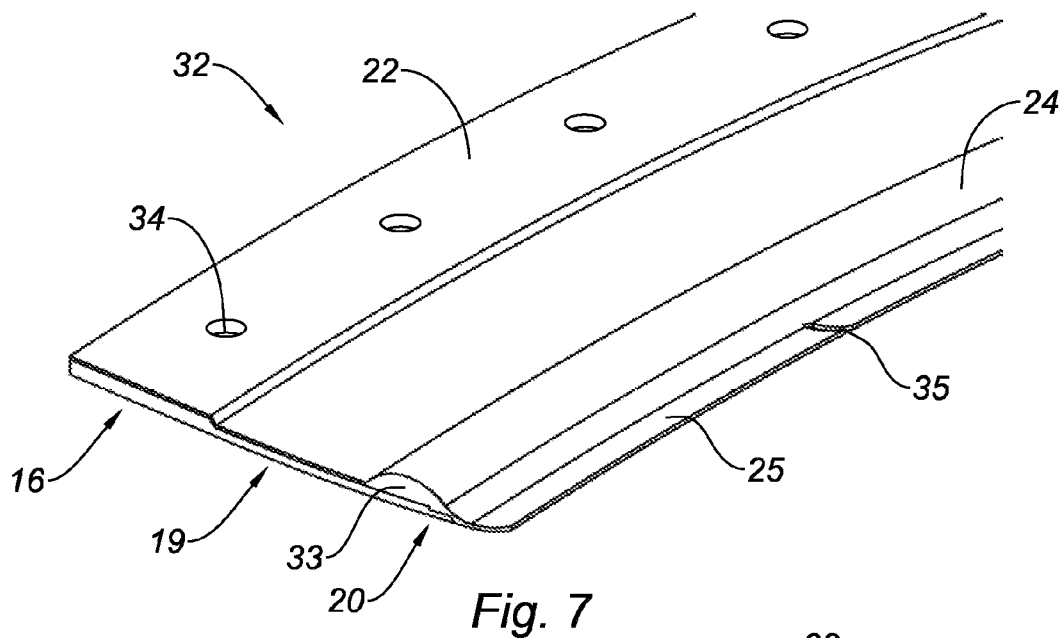
FIG. 7 is a perspective view of an element according to a second form of the present disclosure.

According to a second form, illustrated in FIG. 7, the outer layer 33 of the strip 32, for example in silicone, forms the totality of the end blade 25, and not only a cover layer.

Further, the blade 25 comprises longitudinal slots 35 extending from its free end as far as the bead 24. These slots 35 allow an increase in the deformability of the blade 25 and the detachment of this blade 25 may be avoided so as to improve the flattening of the blade 25 against the shroud 9.

Figure 8:
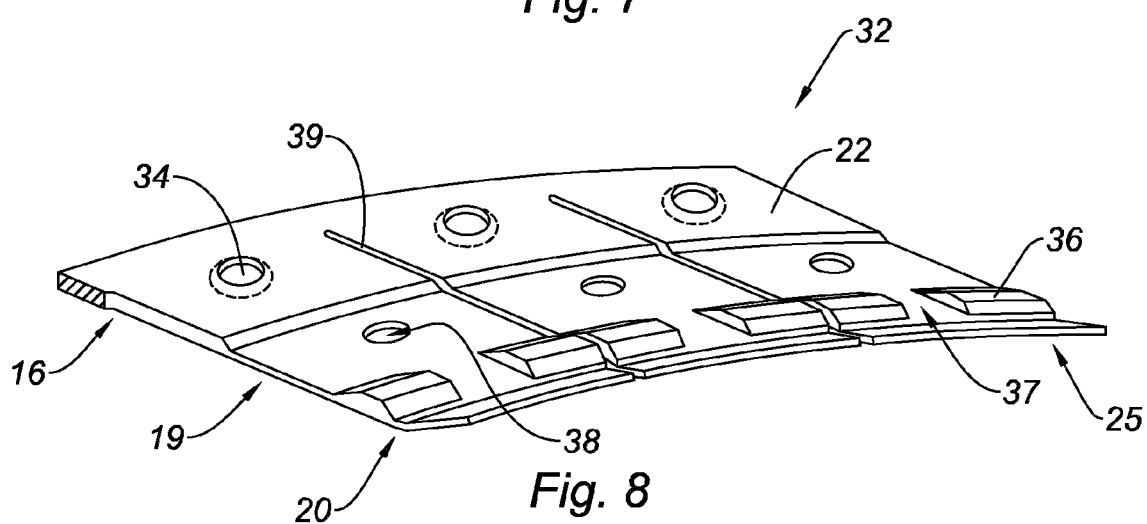
FIG. 8 is a perspective view of an element according to another form of the present disclosure.

According to a third form, illustrated in FIG. 8, a continuous annular bead 24 is no longer provided, but a discontinuous bead, forming a succession of distinct studs 36 along the blade 25. Axial passages 37 are thus defined between two successive studs 36, which passages allow the inner and outer sides of the element 15, during operation, to be at an equal pressure. For the same purpose, provision may be made in the strip 32 for radial through-orifices 38 as an addition or a replacement for the passages 37.

Further, the strip 32 comprises axial slots 39 opening at its downstream end, in order to increase the elastic deformability of the element 15. In order to limit the aerodynamic impact of the slots 39, the latter may be filled with elastomeric material.

Moreover, the end blade 25 is substantially planar here, and tilted outwards.

Figure 9:
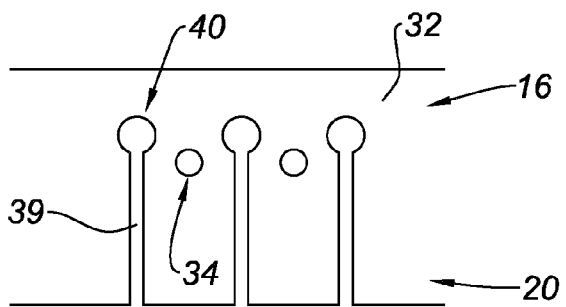
FIG. 9 is a schematized planar view of an element according to the present disclosure, including slots each opening into a circular orifice.

In the advantageous alternative illustrated in FIG. 9, the upstream end of the slots 39 opens into a circular orifice 40, which gives the possibility of preventing or considerably limiting the initiations of cracks at the end of the slot. Preferably, the apertures 34 for attaching the strip 32 on the lip 8 are located downstream from these circular orifices 40 so as not to subject said orifices 34 to fatigue.

In practice, several strips 32, typically two, are screwed edge to edge on the lip 8 and slightly pre-stressed by reducing their length, (i.e. along a diameter), in order to form an aerodynamic continuity element 15 which may be efficiently pressed against the lip 8 and the shroud 9. This compression is made possible by the flexibility of the element 15, due to the single material which makes it up and/or to the presence of axial slots 39, filled with a material capable of absorbing deformations induced by compression.

When the lip 8 is in the rear operating position, as illustrated in FIG. 3, the element 15 is substantially tangent to the lip 8 and to the shroud 9 against which it radially bears.

When the lip 8 is moved relatively to the shroud 9 from the front maintenance position to the rear operating position, the bead 24—or the studs 36—first come into contact with the shroud 9, more specifically with the chamfer 28. Consequently, the downstream portion 20 of the element 15 is radially moved apart towards the interior of the shroud 9. This allows engagement without any difficulty of the element 15 at the inner periphery of the shroud 9, and of the cowl against the middle section 5 of the nacelle 1, without damaging the end blade 25. At the end of the translational movement rearwards, the blade 25, because of its elasticity and its tilt, will be flattened against the shroud 9. The element is designed so as to allow the opening and the closing of the cowl without having to disassemble any part, and in order to be able to support these successive displacements for many cycles, for example of the order of 3,500 cycles.

The presence of the blade 25 allows compensation for the axial and radial positioning deviations between the lip 8 and the shroud 9 by providing a covering means flattened against the shroud 9. By providing a flexible, elastically deformable blade and tilted outwards, any detachment of its downstream end is avoided and the aerodynamic continuity is therefore improved. The blade 25 further allows adaptation of the element 15 to the shapes and to the tolerances of the lip 8 and of the shroud 9.

It is understood that the characteristics of the different forms described above may be combined with each other. Thus, it is notably the strip according to the first embodiment which may include means for pressure equalization, the blade of the strip of FIG. 8 may be curved, the bead of FIG. 7 may be discontinuous, etc.

Thus, the present disclosure provides a decisive improvement to the prior art, by providing an element allowing aerodynamic optimization of the interface between the downstream edge of an air intake lip of a cowl of the LFC type and the acoustic shroud extending between this edge and the fan case.

The present disclosure is not limited to the various forms described above as examples but that it comprises all the technical equivalents and alternatives of the means described as well as their combinations.

What is claimed is:

1. An aerodynamic element for an aircraft nacelle, said nacelle comprising a fixed shroud and an intake lip axially moveable relative to the shroud, said aerodynamic element being flexible and having a substantially cylindrical general shape and comprising:
    an upstream portion attached to an inner wall of the intake lip of the nacelle; and
    a downstream portion bearing radially against an inner face of the shroud such that the downstream portion is movable in an axial direction with respect to the shroud, the upstream and downstream portions being formed in a single piece;
    wherein the downstream portion of the aerodynamic element includes a ring shaped solid bead protruding towards an outside of the aerodynamic element and an end blade which, at rest, is tilted towards the outside of the aerodynamic element in a direction of its free end.

2. The aerodynamic element according to claim 1, wherein the end blade has a thickness less than a thickness of other portions of the aerodynamic element.

3. The aerodynamic element according to claim 1, wherein the end blade is substantially planar.

4. The aerodynamic element according to claim 1, wherein the end blade is curved with concavity turned outwards.

5. The aerodynamic element according to claim 1, further comprising means for equalizing pressure on inner and outer sides of the aerodynamic element.

6. The aerodynamic element according to claim 5, wherein said pressure equalization means comprise radial through-orifices made in the aerodynamic element.

7. The aerodynamic element according to claim 5, wherein said pressure equalization means comprise axial passages made in the ring shaped solid bead.

8. The aerodynamic element according to claim 1, wherein the ring shaped solid bead is substantially continuous.

9. The aerodynamic element according to claim 1, wherein the aerodynamic element is made in a composite material which includes at least one substantially continuous frame on its periphery.

10. The aerodynamic element according to claim 1, wherein the aerodynamic element comprises axial slots at its downstream end, said slots being filled with an elastomeric material.

11. The aerodynamic element according to claim 1 wherein the aerodynamic element is made of a flexible material.

12. The aerodynamic element according to claim 11, wherein the aerodynamic element is made from at least two substantially identical strips rolled over themselves and attached end to end along axial lines in order to form together a substantially cylindrical general shape.

13. The aerodynamic element according to claim 1, wherein the aerodynamic element comprises an intermediate portion located between the upstream portion and the downstream portion and the upstream portion has a larger thickness than that of the intermediate portion.

14. An aircraft nacelle comprising a fixed shroud and an intake lip axially moveable relatively to the shroud, between a rear operating position and a front maintenance position, wherein the aircraft nacelle comprises the aerodynamic element according to claim 1, the nacelle being laid out so that, when the intake lip is in the rear operating position, the upstream portion of the aerodynamic element is attached against an inner face of the inner wall of the intake lip of the nacelle, and housed in a recess formed by an axially inward set back step, and the downstream portion of the aerodynamic element radially bears against the inner face of the shroud, the ring shaped solid bead being housed in a recess formed by an axially inward set back step.

\* \* \* \* \*